United States Patent Office 2,908,856
Patented Oct. 13, 1959

2,908,856

COMPOUNDED SINGLE-PHASE OR POLYPHASE ALTERNATING CURRENT GENERATORS

Oscar Ebbe Käll, Ljungby, Sweden, assignor to Kellma Aktiebolag, Ljungby, Sweden Application October 25, 1957, Serial No. 692,448

Claims priority, application Sweden October 31, 1956

3 Claims. (Cl. 322—17)

The present invention refers to compounded single-phase or polyphase alternating current generators and constitutes a further development of the type of generator which is disclosed in my United States patent application Serial No. 570,463, filed on March 9, 1956. Relevant parts of the specification of said earlier application will therefore be relied upon also in connection with the description of the present invention.

The object of the invention is to provide an alternating current generator which is capable of maintaining the output voltage thereof constant at varying loads by means of an exciter of extremely simple mechanical and electrical design of the kind which produces its direct current output, as required for the excitation of the generator, solely by converting an alternating current derived from the armature winding of the generator by means of a commutator and a brush gear cooperating therewith.

The improved generator is characterized by the fact that, for each phase, equal inductances or resistances, which together with the commutator form a stationary part of the exciter, are serially interconnected to form a set, in a number equal to half the number of segments per phase of the commutator, that a number of the commutator segments equal to the whole number thereof divided by the number of phases are alloted to the set of inductances or resistances for each phase and each two segments which are equally angularly spaced from the middle segment among those allotted to one of the sets of inductances or resistances are connected to each other through equalizing connections and to one of the connecting points between the inductances or resistances of the set, while the middle segment is connected to one end of the respective set of inductances or resistances, that the set of inductances or resistances associated with each phase is connected in the armature circuit of the generator directly or through a transformer and that the brush gear is mounted on the generator shaft for rotation together with the generator rotor and has its brushes fixedly connected to the excitation winding on the rotor.

Figure 1:
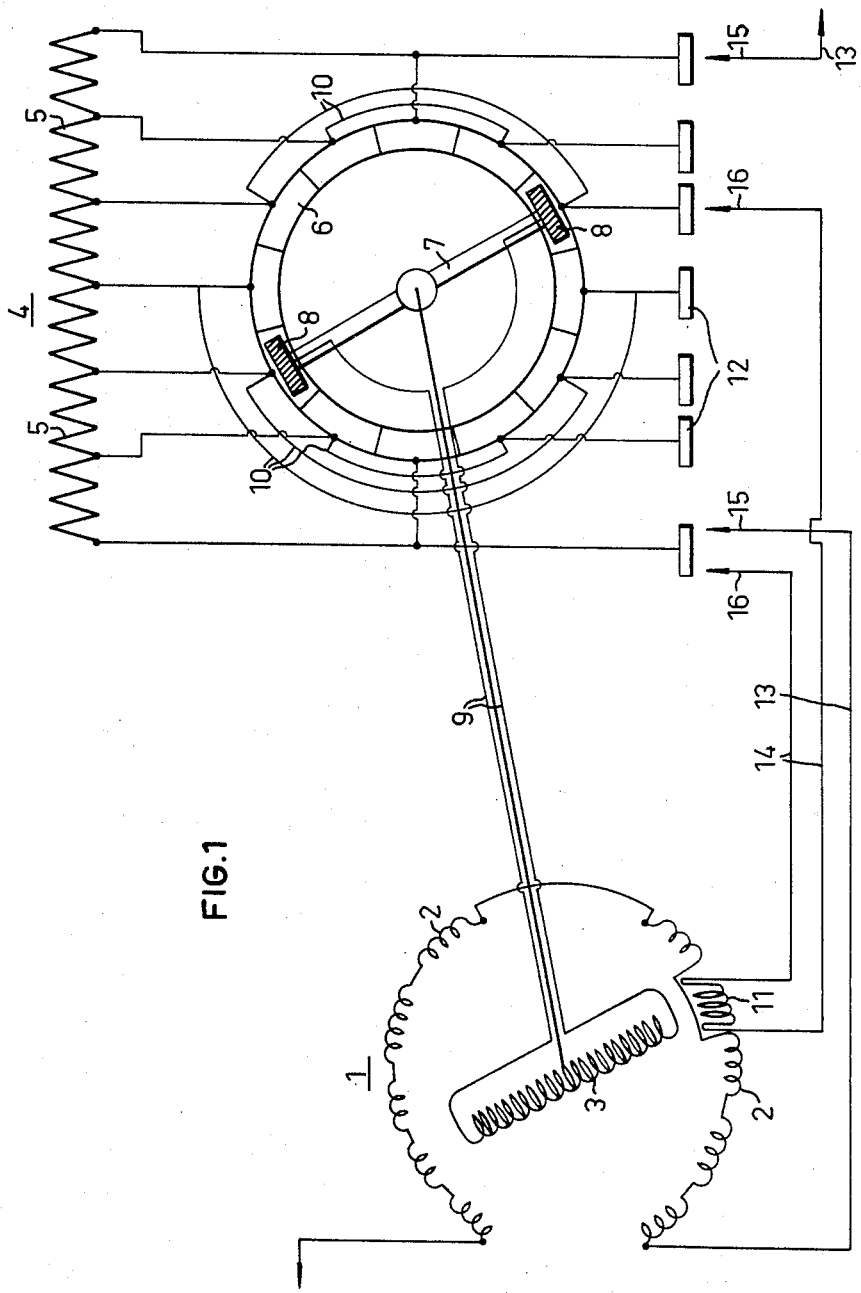
Figure 2:
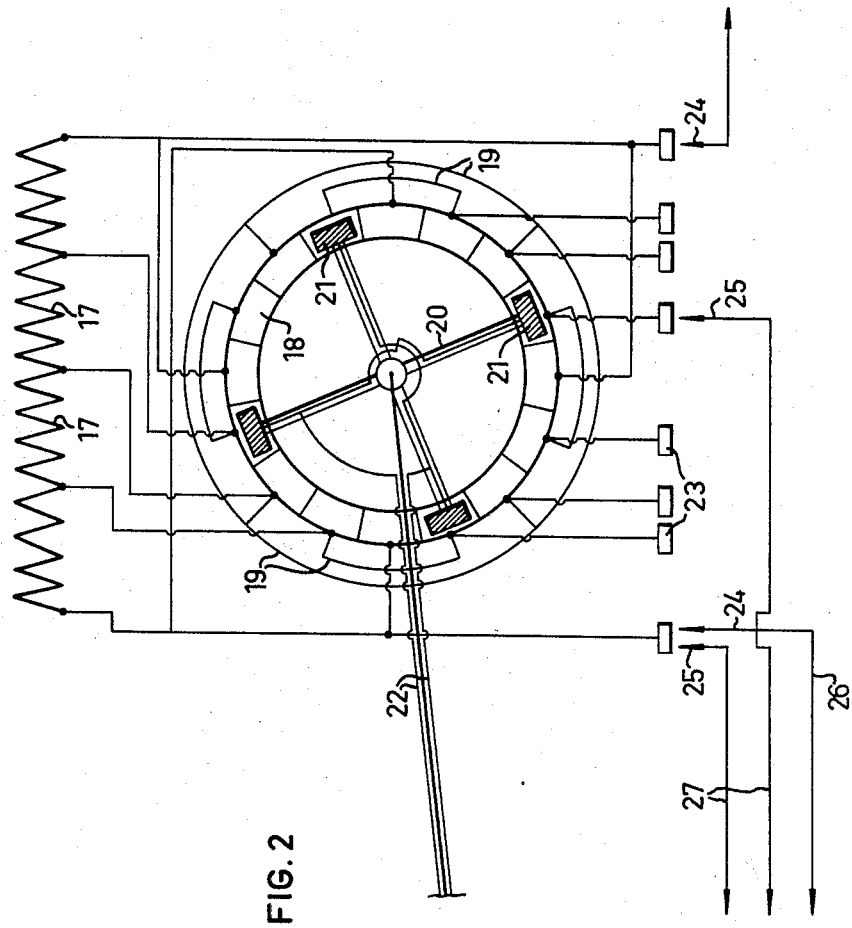

The invention will be described in detail with reference to the accompanying drawings, in which Fig. 1 symbolically illustrates a single-phase bi-polar alternating current generator, and Fig. 2 illustrates, in a more simplified symbolic form, a single-phase four-polar alternating current generator constructed according to the invention.

Referring more particularly to Fig. 1 in the drawings, there is shown an alternating current generator 1. It comprises a stator on which a single-phase armature winding 2 is symmetrically disposed in two halves on two thirds of the circumference, and a rotor which carries an excitation winding 3 disposed on two poles. The exciter of the generator, which is shown at 4, consists of a stationary part comprising a number of resistances 5 which are serially interconnected to form a continuous set, and a commutator 6 whose segments are connected with the resistances, as described in detail below, and a rotating part which is composed of a brush gear 7 mounted on the generator shaft and cooperating with the commutator, said brush gear having two brushes 8 which are connected with the excitation winding 3 through fixed conductors 9 to form a direct current circuit.

The number of resistances 5 is equal to half the number of segments of the commutator 6. Two diametrically opposed segments are connected each with one end of the whole set of resistances, and each two of the remaining segments which are equally angularly spaced from one of the two first mentioned segments are connected with each other through equalizing connections 10 and also with one of the connecting points between the resistances 5.

The set of resistances 5 is connected in the armature circuit of the generator 1 so as to be passed by the armature current when the generator has a load applied to it. Furthermore, it is provided for all or part of the resistances of the set to be passed also by no-load current from the generator, when no exterior load is applied, one coil 11 of the armature winding 2 being included in a special armature circuit which can be carried through part or all of the resistances 5. As illustrated in the drawings, to obtain the desired possibilities of variation with regard to the connection of the resistances into the armature circuit, the terminal points and the intermediate connecting points of the set of resistances are connected to fixed contact members 12 on a contact strip or the like and the conductors 13 and 14 of the armature circuits connected to two pairs of movable contact members 15 or 16, respectively, which are capable of being applied to any of the contact members 12. It will be seen, that by the selection of the contact members 12 to which contact members 15 are applied, one may vary, within wide limits, the magnitude and phase of the alternating current voltage which, with a load connected in circuit, is derived across the resistances 5 and rectified through the commutator 6 and brush gear 7 to be applied to the excitation winding 3 as a pulsating direct current voltage. Similarly, the magnitude and phase of the alternating current voltage from the coil 11 which at no load is derived across the resistances 5 and likewise rectified through the commutator and brush gear may be varied by the selection of the contact members 12 to which the contact members 16 are applied. The coil of the armature winding which has been chosen as the coil 11 delivering the no-load voltage to the exciter is purposely offset in relation to a line of symmetry through the middle of the armature winding halves, so that the difference between the absolute values between which the derived no-load voltage may vary will be as great as possible. In the case of a symmetrical location of the coil 11, if the whole of the voltage from the coil is $V_0$, the variation at the changing of the contact members 16 might occur between zero and $\frac{1}{2} V_0$ on both sides of the zero position, i.e. the range of variation of the absolute value of the voltage would be only $\frac{1}{2} V_0$.

The equalizing connections 9 have proved to be of major importance for the function of the device. In the absence of these connections, the direct current voltage output from the brush gear 7 which would be expected as a consequence of the voltage division and voltage reversion which the exciter is relied upon to provide is not obtained. The theory which would explain this result is not yet established, but one may get an idea of the nature thereof by noting that when the brush gear 7 occupies an angular position such that the brushes 8 thereof engage the commutator segments which are 90° displaced from the segments connected with the terminals of the set of resistances 5, the equalizing connection provided between the first mentioned segments will shortcircuit the excitation circuit, which results in this circuit being passed by a current originating from the magnetic energy stored in the excitation winding 3. In other positions of the brush gear, the excitation circuit is closed through a certain part of the resistances 5, and the excitation winding is therefore relied upon to a lesser degree only for maintaining the flow of current in the circuit. Summarizing it may therefore be said that the equalizing connections permit a certain smoothing of the pulsating direct current obtained, owing to the inductance of the excitation winding functioning to retard the current changes.

Fig. 2 illustrates the invention applied to a single-phase four-polar alternating current generator. The design is similar to that described above, as to the principal features thereof, but the number of resistances 17 is equal to one fourth of the number of segments of the commutator 18. Two segments which are spaced 180° apart are connected with each other and with one terminal of the whole set of resistances, and two further segments which are spaced 180° apart and 90° from the two first mentioned segments are similarly connected with each other and with the other terminal of the set of resistances. Each two of the remaining segments which are equally angularly spaced from one of the said four segments are connected, on one hand, with each other through equalizing connections 19 and, on the other hand, with one of the connecting points between the resistances. (Because the commutator has an even number of segments per pole, all of those four segments which are displaced from the segments connected with the terminals of the set of resistances will be connected with each other and with the middle one of the connecting points between the resistances 17. If the number of segments per pole is an odd number, no such interconnection of four segments through the equalizing connections will result.)

In Fig. 2, the brush gear 20 comprises four brushes 21, each two thereof which are diametrically opposed being connected with each other and with one of the two fixed conductors 22 to the excitation winding.

The connection of the resistances 17 in the armature circuit of the generator through fixed contact members 23, movable contact members 24 and 25 cooperating therewith, and conductors 26 and 27 attached to the latter is made in full conformity with that already described in connection with Fig. 1. Therefore, the generator has not been included in Fig. 2. The function of the device of Fig. 2 is also quite in agreement with that already described.

The invention may also be applied to alternating current generators having a number of phases. For example, in the case of a three-phase generator, the exciter may have three sets of resistances which are connected in the armature circuit either in Δ or in Y connection. In this case, the number of resistances in each set will be one half of the number of segments per phase of the commutator and one third of the number of segments will be allotted to each set. Each two of the segments which are equally angularly spaced from the middle one of those allotted to one of the sets of resistances will be connected with each other through equalizing connections and with one of the connecting points between the resistances of the set. The said middle segment will be connected with one terminal of the respective set of resistances. The brush gear will be provided with brushes of alternately plus and minus polarity, two adjacent brushes of different polarity being connected with the excitation winding and the remaining brushes being connected with each other two and two, so as to form a series connection of a number of pairs of brushes through the resistances 5.

Within the scope of the invention a multiplicity of modifications of the design may be made. The resistances of the exciter may, for example, be connected in the armature circuit of a generator through transformers instead of directly. Furthermore, the resistances may be replaced by inductances; it should be noted that also in the latter case the reactance only of each particular inductance is of importance, as it is not here a question of any mutual inductive action.

What I claim and desire to secure by Letters Patent is:

1. In a compounded synchronous alternating current generator arranged for an odd number of phases from single phase upwards, including a stator, an armature winding on said stator, a rotor within said stator and an excitation winding on said rotor, the provision of means for converting alternating current derived from said armature winding into direct current and supplying said direct current to said excitation winding, said means comprising, for each phase, a set of equal serially interconnected reactance elements, a commutator fixed in relation to said reactance elements and having a number of segments per phase equal to twice the number of reactance elements in said set, said reactance elements and said commutator forming the stationary part of the exciter, a number of the commutator segments equal to the whole number thereof divided by the number of phases being allotted to the set of reactance elements for each phase, means connecting each two segments which are equally angularly spaced from the middle segment among those allotted to one set of reactance elements with each other and with one of the connecting points between the reactance elements of said one set, the middle segment being connected to one end of the respective set of reactance elements, means for connecting the set of reactance elements associated with each phase in the armature circuit of the generator, and brush means coupled to the generator rotor for rotation with the latter and having electrical connections fixed to the excitation winding on said rotor.

2. In a compounded synchronous alternating current generator according to claim 1, the further characteristic that said means for connecting the set of reactance elements associated with each phase in the armature circuit of the generator comprises stationary contact members connected with the terminal points and intermediate junction points of an associated set of reactance elements, movable contact members connected with said generator armature winding at various points thereof, said stationary and movable contact members having adjustable engagement with each other to permit variation in the connection of said reactance elements.

3. In a compounded synchronous alternating current generator arranged for an odd number of phases from single phase upwards, including a stator, an armature winding on said stator, a rotor within said stator and an excitation winding on said rotor, the provision of means for converting alternating current derived from said armature winding into direct current and supplying said direct current to said excitation winding, said means comprising, for each phase, a set of equal serially interconnected reactance elements, a commutator fixed in relation to said reactance elements and having a number of segments per phase equal to twice the number of reactance elements in said set, said reactance elements and said commutator forming the stationary part of the exciter, a number of the commutator segments equal to the whole number thereof divided by the number of phases being allotted to the set of reactance elements for each phase, means connecting each two segments which are equally angularly spaced from the middle segment among those allotted to one set of reactance elements with each other and with one of the connecting points between the reactance elements of said one set, the middle segment being connected to one end of the respective set of reactance elements, means for connecting the set of reactance elements associated with each phase in a circuit through the whole of the armature winding of the respective phase on the generator, means for connecting the set of reactance elements associated with each phase in another circuit through part of the armature winding of the respective phase on the generator for obtaining no-load excitation of the generator, and brush means coupled to the generator rotor for rotation with the latter and having electrical connections fixed to the excitation winding on said rotor.

References Cited in the file of this patent

UNITED STATES PATENTS 1,385,895   Stone et al. _____ July 26, 1921

FOREIGN PATENTS 375,091   France _____ June 29, 1907